United States Patent [19]

Plume

[11] Patent Number: 4,660,235
[45] Date of Patent: Apr. 28, 1987

[54] CONVERTIBLE SEAT-BED WITH IMPROVED ACTUATOR FOR THIRD PANEL

[76] Inventor: Robert W. Plume, P.O. Box 105, Washington, Mich. 48094

[21] Appl. No.: 755,937

[22] Filed: Jul. 16, 1985

[51] Int. Cl.$^4$ ............................................. A47C 17/16
[52] U.S. Cl. .......................................... 5/38; 5/37 C; 5/47; 5/55 R; 5/57 B
[58] Field of Search ...................... 5/37 C, 37 R, 37 B, 5/38, 41, 47, 48, 55 R, 57 B

[56] References Cited

U.S. PATENT DOCUMENTS

| | | | |
|---|---|---|---|
| 2,136,830 | 11/1938 | Vallone | 5/47 |
| 2,297,526 | 9/1942 | Bayer | 5/47 |
| 4,365,369 | 12/1982 | Plume | 5/37 C |

*Primary Examiner*—Carl D. Friedman
*Assistant Examiner*—Richard Chilcot
*Attorney, Agent, or Firm*—Reising, Ethington, Barnard, Perry & Milton

[57] ABSTRACT

A three cushion convertible seat-bed is disclosed. First and second panels (12,14) are pivotally coupled to each other and are supported by a base (10) to form a seat bottom and a seat back in the seat orientation and to form side-by-side bed panels in a bed orientation. A third panel (16) is pivotally coupled with the second panel and forms a third bed panel in the bed orientation. A latch D secures the third panel relative to the base. A manual operating lever (22) operates the latch and the pull member (76) is adapted for manual actuation for folding the panels from the bed orientation to the seat orientation. The third panel includes a leg (20) for carrying the rear edge of the panel between the bed and seat orientation. An energy storage spring (224) is actuated to store energy by movement of the panels from the bed orientation to the seat orientation. An actuating lever (212) is coupled with the spring through an overcenter linkage (218) and is actuable for pushing the third panel toward the bed orientation upon unlatching of the latch.

10 Claims, 9 Drawing Figures

CONVERTIBLE SEAT-BED WITH IMPROVED ACTUATOR FOR THIRD PANEL

FIELD OF THE INVENTION

This invention relates to seating apparatus of the type which is convertibel from a seat to a bed; more particularly, it relates to a convertible seatbed especially adapted for use in recreational vehicles.

BACKGROUND OF THE INVENTION

Recreational vehicles, such as vans, are commonly fitted with passenger seating apparatus which is convertible into a bed. It is desired to provide a seat and a bed affording utility and comfort which are not compromised by reason of the convertability betwen the seat and bed orientations. It is also desired to provide for conversion between the seat and bed orientations by simple manipulation which requires a minimum of manual effort. Further, the impose stringent standards regarding strength and stiffness. Also, the weight of the seating mechanism must be held to a minimum.

A seating mechanism whihc meets the afore mentioned requisites is set forth in my prior U.S. Pat. No. 4,365,369 granted Dec. 28, 1982. There is presently a need for such seating apparatus which is adapted for smaller vans. In particular, a convertible seat-bed mechanism is desired for a van in which the bed occupies almost all of the floor space rearwardly of the seat location. Thus, the user must be able to convert between seat and bed orientations while standing at the side door. Further, in the smaller van, the floorboard is inclined, making it more difficult to extend the third panel ofa three panel arrangement to the bed orientation.

In my aforementioned patent, a three cushion convertible seat-bed is disclosed with first and second panels for the seat back and seat bottom mounted on a seat base and a third panel pivotally coupled with the seat back. The conversion mechanism includes a quadrant plate pivotally supported on the base. The lower part of the seat back is rigidly connected with the quadrant plate and the rear edge of the seat bottom is pivotally coupled wtih the quadrant plate so that the three panels can be unfolded from teh seat orientation to a bed orientation. A first set of latches holds the conversion mechanoism in the seat orientation and are released sequentially by moving an operating handle. The same operating handle causes actuating means to thrust the third panel rearwardly toward the bed orientation as the first and second panels are unfolded. THe quadrant plate pivots durign unfolding and shifts the panels forwardly in the bed orientation to reduce the space required rearwardly of the seat. When the panels reach the bed orientation a second set of latches are latched to hold the mechanism in the bed orientation and to provide stiffening of the structure. To convert from bed-to-seat orientation, the operating handle is pulled in the same direction and the operator pulls on a strap near the juncture of the second and third panels. The movement of the operating handle unlatches the second set of latches sequentially and the second panel is pulled toward an erect position. This rotates the quadrant plate and pulls the front panel downwardly and to the rear and causes the third panel to swing forwardly. This action causes the first set of latches to relatch and hold the mechanism in the seat orientation.

A general object of this invention is to provide an improved convertible seat bed mechanism which is especially adapted for a small van. A particular object is to provide an improved mechanism for actuating the third panel from the seat orientation to the bed orientation.

SUMMARY OF THE INVENTION

In accordance with this invention, a convertible seatbed is provided with an improved mechanism for converting between the seat and bed orientation. The conversion mechanism is simple to operate from a position at the side door of the vehicle and the conversion requires a minimum of manual effort by the user. The mechanism utilizes mechanically stored energy to actuate the third panel tothe bed orientation and energy is stored for that purpose by conversion from the bed-to-seat orientation.

According to the invention, the convertible seat-bed mechanism comprises a base with first and second panels pivotally coupled to each other and supported by the base to form a seat bottom and seat back in a seat orientation and to form side-by-side bed panels in a bed orientation. A third panel is pivotally coupled with the second panel and forms a third bed panel in the bed orientation. Latching means including a first latch secures the third panel relative tothe base. Manually actuable means operates the latching means and a pull member adapted for folding the panels from the bed orientation to the seat orientation. The third panel includes a leg for carrying the rear edge thereof between the bed and seat orientations. Energy storage menas, preferably a coil spring, is actuated to store energy by movement of the panels from the bed orientation to the seat orientation. An actuating means is coupled with the nergy storage means and is actuable thereby for pushing the third panel toward the bed orientation upon unlatching of the first latch. Further, according to the invention, means are provided for lowering the rear of the first panel when the mechanism is converted from the bed orientation to the seat orientation and said actuating means comprises a linkage between the energy storage spring and the first panel for stretching the spring when the mechanism is converted from teh bed orientation to the seat orientation. Further, according to the invention, the linkage is an overcenter linkage which enables energy storage during bed-to-seat conversion and energy release during seat-to-bed conversion.

A more complete understanding of the invention may be obtained from the detailed description that follows taken with the accompanying drawings.

BEST MODE FOR CARRYING OUT THE INVENTION

Referring now to the drawings, there is shown an illustrative embodiment of the invention in a convertibel seat-bed especially adapted for use in a small van vehicle. It will be appreciated, however, as the description proceeds that the invention may be useful in other applications.

Figure 1:
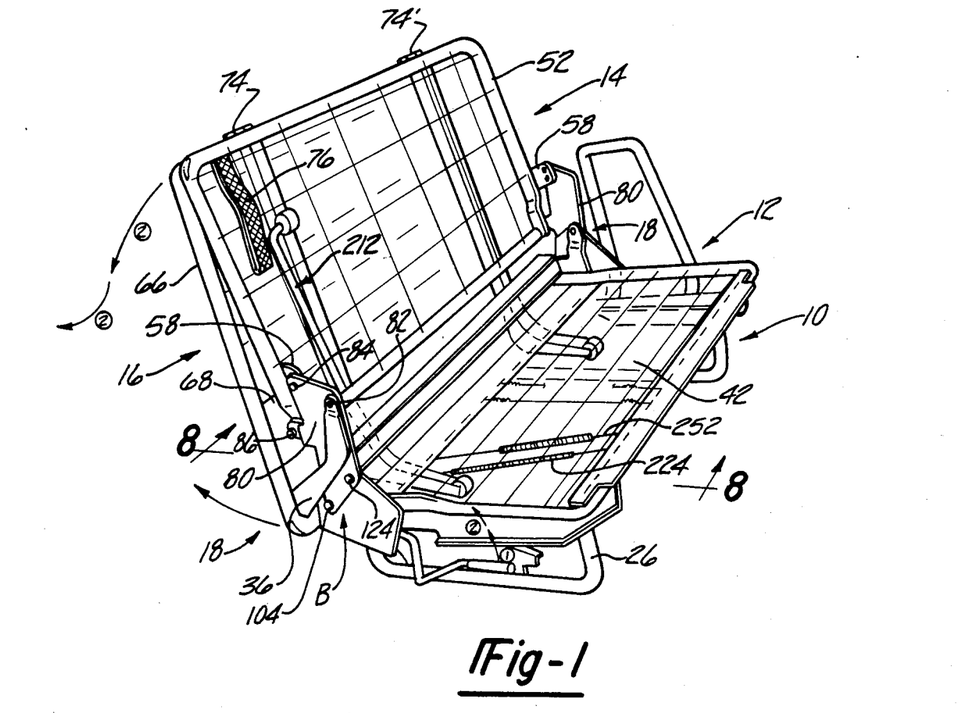
FIG. 1 shows the convertible seat-bed in the seat orientation.
Figure 2:
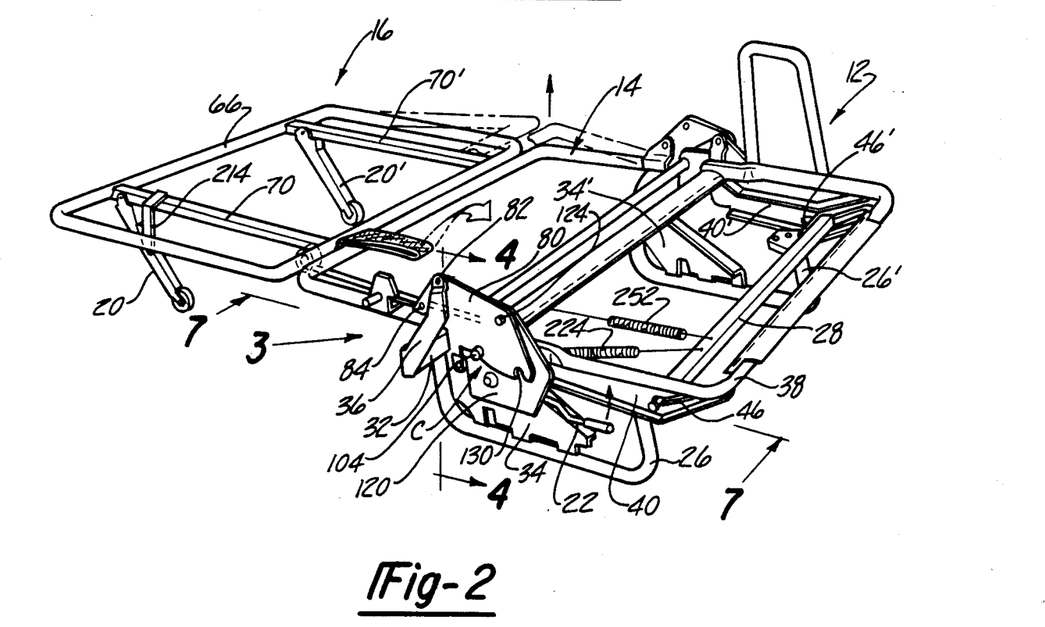
FIG. 2 shows the seat-bed in the bed orientation.

Referring to FIG. 1, the convertible seat-bed is shown in the seat orientation. it comprises, in general, a seat base 10 which is fixedly mounted to the vehicle floor by a suitable means, not shown. A first panel 12 constitutes the seat bottom and is movably supported by the base 10. A second panel 14 constitutes the seat back and is also movably supported byt he seat base. A third panel 16 is pivotally supported byt he second panel 14; it serves as a rear face of the seat back in the seat orientation and as a bed panel in the bed orientation. A conversion mechanism, comprising right hand mechanism 18 and left hand mechanism 18', interconnects the first, second and third panels relative to the base. The mechanisms 18 and 18' are manually operative to unfold the panels from the seat orientation to the bed orientation and vice versa. FIG. 2 depicts the seat-bed in the bed orientation. In this orientation, the first, second and third panels 12, 14 and 16 are all disposed in the same horizontal plane. The first and second panels are supported entirely by the base 10 and the third panel 16 is supported by the second panel and a pair of legs 20 and 20'. An operating handle 22 comprises a part of the right hand conversion mechanism 18 and is manually actuated to effect conversion from the seat to bed orientation and vice versa.

Before proceeding with the description of the conversion mechanism, the structure of the base 10 and the first, second and third panmels 12, 14 and 16, respectively, will be described. The base 10 is a rigid frame comrpising a pair of legs 26 and 26' each of which is U-shaped with the horizontal portion thereof affixed tothe floor of the vehicle. The legs 26 are suitably constructed of round tubing. A front cross beam 28 of square tubing extends between the upper ends of the front portions of legs 26 and 26'. A rear cross beam 32 extends between the upper ends of the rear portin of legs 26 and 26'. The cross beam 32 is secured to the leg 26 by means of a bolt extending through the beam and a flattened end of the leg portion 26 (see FIG. 4). The cross beam 32 is connected with the leg 26' in the same manner. The base also comprises a reinforcing plate 34 of triangular shpae mountedin the U-shaped leg 26 and a reinforcing plate 34' mounted in the U-shaped leg 26'. The base also includes a pair of support arms 36 and 36' which are mounted by bolts on the cross beam 32 at opposite ends thereof. The support arms extend vertically above the plane of the panels in the bed orientation and will be described further below.

Figure 3:
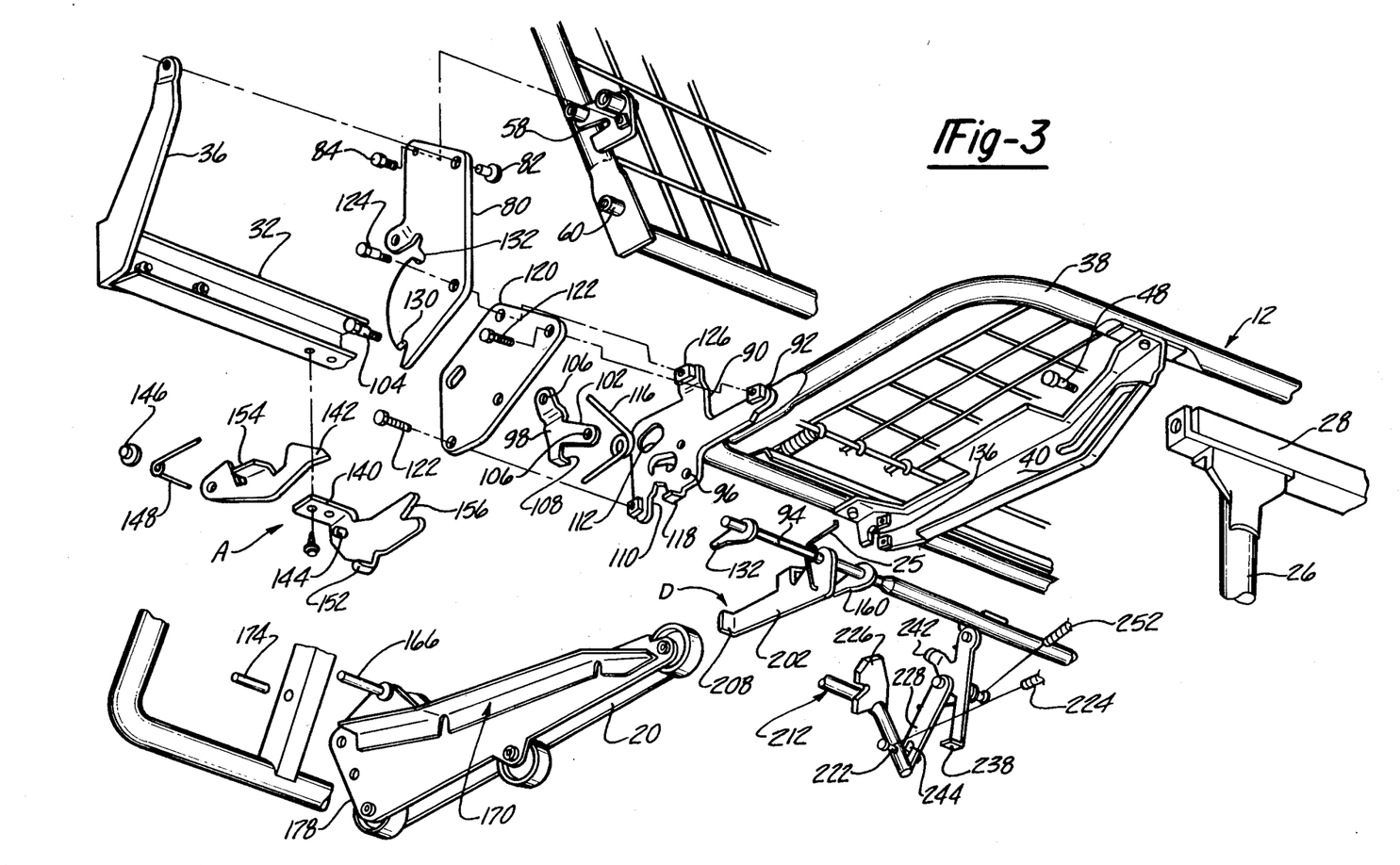
FIG. 3 is an exploded view showing individual parts with the seat-bed in the seat orientation.

The first panel 12 comrpises a support member or frame 38 which is a rectangular frame made of round steel tubing. The support frame 38 includes a pair of carriage plates 40 and 40' extending fore and aft between the front and rear edges of the support frame 38 and secured thereto by bolts, not shown. The support frame 38 is provided with a set of springs 42. A cushion (not shown) is mounted upon and secured to the frame and serves as a seat bottom cushion in the seat orientation and a bed cushion in the bed orientation. The front edge of the first panel 12 is mounted for translational movement in the fore and aft direction upon the base 10. As shown in FIG. 3, the carriage plates 40 and 40' define slots 46 and 46' which are inclined relative to the plane of the support member 38. The carriage plate 40 is supported upon the cross beam 28 by a headed pin 48 secured to the beam and extending through the slot 40'. The carriage plate 46' is supported on the beam 28 in the same manner. The rear edge of the support frame 38 is supported by the right hand conversion mechanism 18 and the left hand conversion mehcanism 18' in a manner that will be described subsequently.

The second panel 14, which constitutes the seat back int he seat orientation, is best shown in FIGS. 1 and 3. Panel 14 comprises a support member or frame 52 which is a rectangular frame constructed of round tubing. A grid 54 of welded steel wire spans the opening within the support frame 52. A cushion (not shown) is mounted upon and secured to the frame 52 to provide a seat back cushion in the seat orientation and a bed cushion in the bed orientation. The lower edge of the panel 14 at the right hand side of the seat is mounted upon the conversion mechanism 18 and at the left hand side is mounted upon the conversio mechanism 18'. For this purpose, a mounting bracket 58 is fixedly mounted, as by welding, on the right hand side portion of the support frame 52. Also, a horizontally extending stud 60 is mounted, as by welding, below the bracket 58 on the support frame 52. Similarly, a corresponding bracket 58' and stud (not shown) are provided on the left hand side portion of the support frame 52. The panel 14 is mounted on a quadrant plate 80 of the conversion mechanism 18 by the bracket 58 and stud 60 in a manner which will be described subsequently. The panel 14 is mounted at the left hand side in a similar manner.

The third panel 16 comrpises a support member or frame 66 which is constructed of round tubing and is generally of rectangular configuration. The support frame 66 includes a pair of beams 70 and 70' which extend fore and aft within the framne and which are secured to the front and rear edges thereof, as by welding. The support frame 66, as shown in FIG. 1, is spanned bya welded wire grid 68. The panel 16 also includes a cushion (not shown) which is supported by and secured to the support frame 66. The upper or forward edge of the frame 66 is pivotally coupled with the upper or rearward edge of the frame 52 by a pair of hinges 74 and 74'. The cushion on panel 16 serves as the rear face of the seat back when in the seat orientation and serves as a bed cusion when in the bed orientation. A pull strap 76 is secured to the upper or rear edge of the frame 52 for purposes which will be described subsequently. The legs 20 and 20' are supported on the beams 70 and 70', in a manner which will be described subsequently.

Before the right hand conversion mechanism 18 and left hand conversion mechanism 18' are described in detail, it will be helpful to consider the general arrangement of the latches which secure the panel sin the seat orientation and in the bed orientation. In the seat orientation, the first panel 12 is secured to the base 10 by a first latch A (see FIGS. 4 and 5). In this orientation, the second panel 14 is secured, through a quadrant plate 80, to the first panel by a second latch B (FIG. 1). Additionally, in the seat orientation, the third panel 16 is secured tothe first panel 12 by a latch D (see FIG. 3). When latches A, B and D are released, the panels may be unfolded into the bed orientation shown in FIG. 3. When the panels are unfolded to the bed orientation, the second panel 14 is secured, through the quadrant plate 80, to the first panel by a third latch C (see FIG. 2) which is automatically latched. Whent he latch C is released the panels may be folded into the seat configuration and the latches A, B and D are automatically latched.

The right hand conversion mechanism 18 and left hand conversion mechanism 18' will now be described. With certain exceptions, these mechanisms are mirror images of each other and only the right hand conversion mechanism 18 will be described explicity. Corresponding parts in the left hand conversion mechanism will be designated by the same reference characters with a prime symbol added thereto.

The right hand conversion mechanism comprises a quadrant plate 80 which is pivotally mounted on the support arm 36 by a pivot pin 82 (see FIGS. 1, 2 and 3). The second panel 14 is rigidly affixed to the quadrant plate 80 by a bolt 84 extending through the plate into the mounting bracket 58 and by a bolt 86 extending through the quadrant plate into the stud 60. In order to support the first panel 12 on the mechanism 18 a latch plate 90 (see FIGS. 3 and 4) is rigidly attached by welding to the support frame 38 of the panel 12. The latch plate 90, and hence the first panel 12, is supported by the quadrant plate 80 and the quadrant plate is latched to the latch plate 90 by the second latch B, in a manner to be described. The latch plate 90 supports an opeating shaft 94 which is rotatably mounted in a circular opening 96 in the latch plate. The operating shaft 94 is rotatable by means of an actuator or operating lever 24 which in turn, is actuated by the operating handle 22 bolted to the lever. The operating lever 24 is biased toward counterclockwise rotation by a torsion spring 25 (see FIG. 6) which is mounted on the operating shaft 94. The torsion spring 25 has one free end seated on the rear portion of the rectangular frame 38 and the other free end seated in an opening in a latch member 202 which will be described subsequently. A latch lever 98 (see FIG. 3) is rotatably mounted on the operating shaft 94 which extends through an opening 102 in one arm of the latch lever. The latch lever 98 carries a latch pin 104 which takes the form of a bolt with a threaded shank extending through an opening 106 int he lever 98 and secured thereto by a nut. The latch lever 98 is formed with a foot 108 which extends perpendicularly to the plane of the lever and through a notch 110 formed in the lower portion of the latch plate 90. The latch plate is formed with an oblong opening 112 to accommodate the nut on the end of the pin 104 and to allow limited pivotal motion of the latch lever 98 around the axis of the operating shaft 94. The latch elver 98 is spring-biased for rotation in a clockwise direction (as viewed fromthe right end fo the shaft 94) by a torsion spring 116. The torsion spring is disposed over the shaft 94 and has one free end seated against a foot 118 on the latch plate 90 and the other free end engaging the bottom of the foot 108 on the latch lever 98. A cover plate 120 is disposed over the latch lever 98 and secured to the latch plate 90 by threaded fasteners 122.

The quadrant plate 80 is pivotally mounted on the latch plate 90 by a pivot pin 124 which extends through a circular opening in the cover plate 120 and threadedly engages a nut 126 on the latch plate 90. It is noted that the pivot axis of the first panel is defined by the pivot pin 124 through the quadrant plte 80 and is offset forwardly from the pivot axis of the quadrant plate which is defined by the pivot pin 82 through the support arm 36. It is also noted that the front edge of the second panel 14 is offset rearwardly from the pivot axis of the quadrant plate as defined by the pivot pin 82.

When the panels are in the seat orientation, as shown in FIG. 1, the latch B secures the second panel 14, through the quadrant plate 80, to the first panel 12. In the latched condition, the quadrant plate 80 is latched to the latch plate 90 in a first position by the latch pin 104, which is seated in a notch 130 in the forward end of the quadrant plate 80. The operating shaft 94, which is rotatable by the operating lever 22, carreis a cam 132 which coacts with the foot 108 on the latch lever 98. When the operating lever 24 is rotated in a counterclockwise direction (as viewed from the right hand end of the seat) the cam 132 engages the foot 108 and the latch lever 98 is rotated in a counterclockwise direction against the bias of spring 116. This rotation of the latch lever 98 moves the latch pin 104 out of the notch 130 and unlatches the quadrant plate 80 from the latch plate 90. This allows unfolding of the panels to the bed orientation, subject, however, to the previous unlatching of the fourth latch D, and the first latch A, in that order, which will be described subsequently.

The latch C, as shown in FIGS. 2 and 3, secures the second panel 14, through the quadrant plate 80, to the first panel 12. The latch C comprises the latch lever 98 and a second notch 132 in the quadrant plate 80, near the mid-portion therefore. Whent he second panel 14 is unfolded, the spring bias on latch lever 98 causes the latch pin 104 to enter the notch 132 to latch the quadrant plate 80 to the latch plate 90. Whenthe operating lever 24 is rotated in a counterclockwise direction (as viewed fromthe right hand end fo the seat) the cam 132 engages the foot 108 and the latch lever 98 is rotated to move the pin 104 out of the notch 132 to unlatch the quadrant plate from the latch plate.

Figure 4:
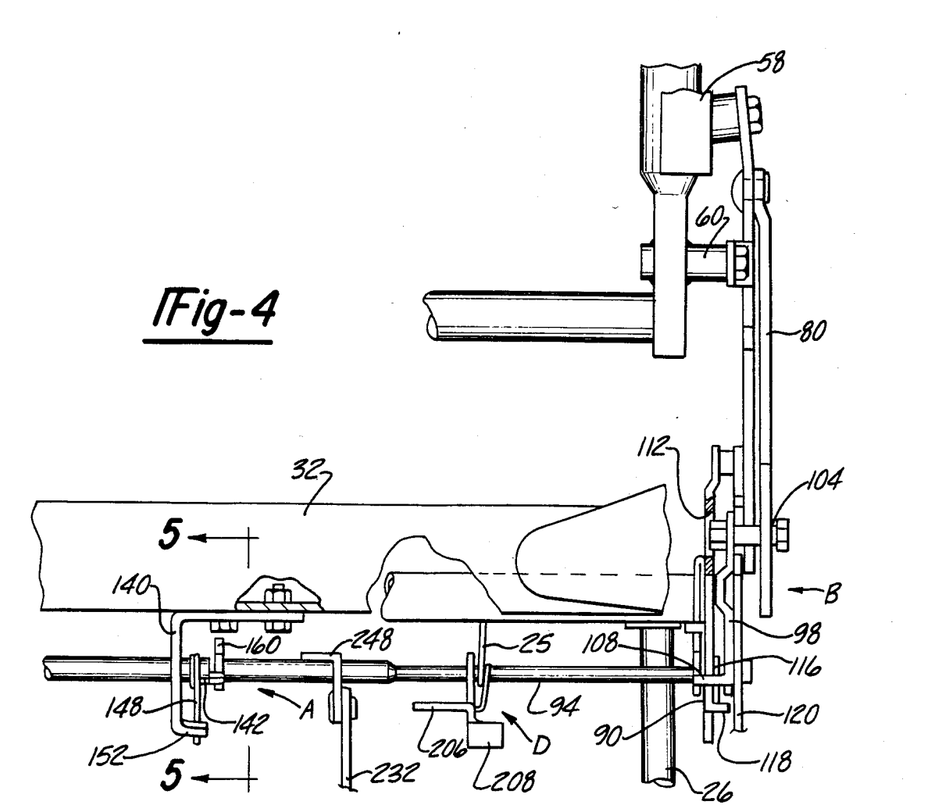
FIG. 4 is a rear elevation view taken on lines 4—4 of FIG. 2.
Figure 5:
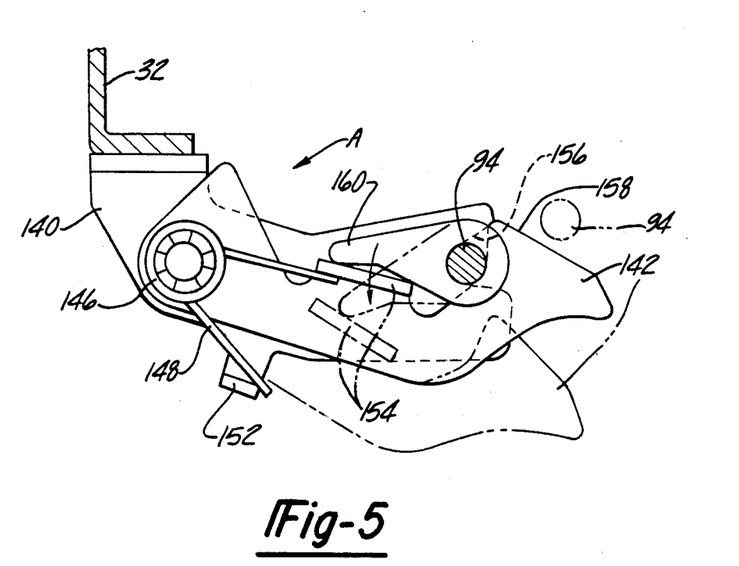
FIG. 5 is a view taken on lines 5—5 of FIG. 4.

As described above,the first panel 12 is secured to the base 10 by teh first latch A, which is shown in FIGS. 4 and 5. Before describing latch A, however, it is noted that the operating shaft 94 is pivotally supported in the rear end of the fore and aft carriage plate 40 which forms part of support frame 38. As shown in FIG. 3, a notch 136 is provided in the end of plate 40 to accept the shaft 94. The shaft is retained in the notch 136 by a U-shpaed retaining member (not shown) which is bolted onto the plate 40. In a similar manner the shaft 94 is rotatably supported in the rear end of the plate 40'.

The latch A, as shown in FIGS. 3 and 4, secures the operating shaft 94, and hence the first panel 12, to the cross beam 32 of the base 10. For this purpose, a latch bracket 140 is bolted to the beam 32 and a latch lever 142 is pivotally mounted thereon by a pivot pin 144 which is held by a speednut 146. The latch lever is biased toward rotation in the counterclockwise direction (as viewed in FIG. 5) by a coil spring 148. The spring 148 has one free end seated agaoist a foot 152 on the bracket 140 and the other free end pressing against a foot 154 on the latch lever 142. The outer end of the latch bracket 140 defines a U-shaped notch 156 which receives the operating shaft 194 and traps it in the notch 156 when the latch lever is in its upper position. A cam 160 is mounted on the operating shaft 194 for actuation of the latch lever 142. The cam 160 engages the foot 154 on the latch lever 142 and rotates the lever downwardly whent he operating shaft is rotated in a counterclockwise direction (as viewed from the right hand end of the seat). This rotation unlatches the first latch A and releases a first panel 12 from the base 10 to allow unfolding of the panels into the bed orientation, subject to unlatching of the second latch B and provided that the fourth latch D is unlatched.

Figure 6:
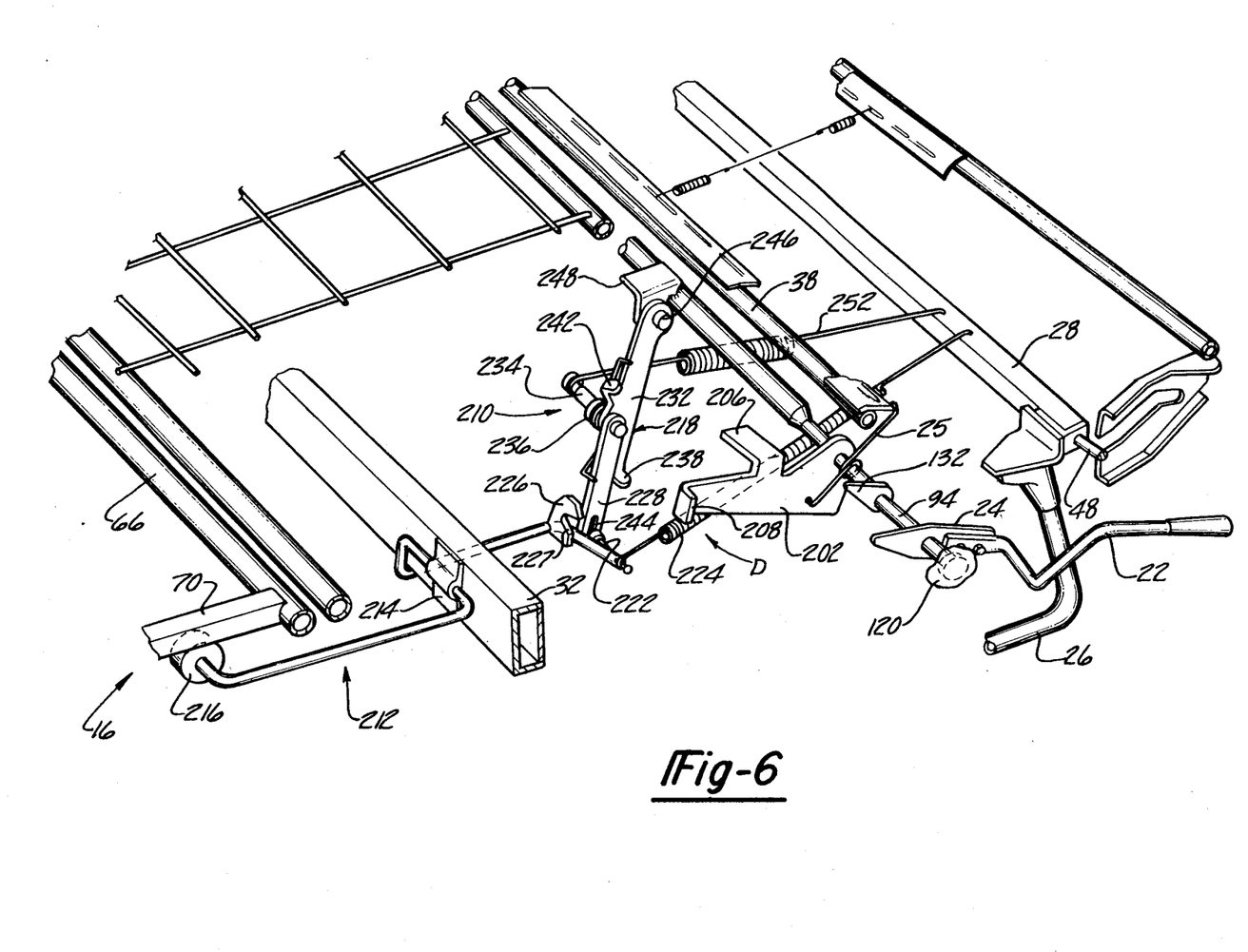
FIG. 6 is perspective view taken in the direction of the arrow 3 of FIG. 2.

As mentioned above, the fourth latch D secures the third panel 16 to the first panel 12 when the panels are in the seat orientation. As shown in FIGS. 3 and 6, the fourth latch D comprises a latch member 202 which is mountedon the operating shaft 94 for rotation therewith. The shaft 94, and hence latch member is spring-biased byt he torsion spring 25 202, as desbribed above. The latch member 202 is provided with a latch piece 208 extending laterally from the member 202. The latch member 202 also includes a stop arm 206 extending laterally from the member, for reasons which will be discussed presently. The latch D also comprises a latch hook 214 which is mounted on beam 70 of the support frame 66 of the third panel 16 (see FIG. 2). With the panels in the seat orientation, as shown in FIG. 1, the hook 214 engaes the latch piece 208 and secures the third panel to the first panel through the operating shaft 94. THe latch D is unlatched by rotation of the operating handle 22 in a counterclockwise direction, as viewed in FIG. 1. The latch D is automatically latched when the panels are folded from the bed orientation to the seat orientation. Whent he latch D is unlatched by rotation of the operating handle 22, the third panel 16 may be unfolded to the bed orientation, subject to unlatching of the first latch A and the second latch B, as described above.

For the purpsoe of converting from the seat orientation to the bed orientation, the fourth latch D, first latch A and second latch B are unlatched in the sequence named for purposes which will become apparent as the descripton proceeds. For this purpose, the hook 214 of latch D is adapted to clear the latch piece 208 during the first increment of rotation of the opeating handle 22 from its rest position. After this first increment of motion, the third panel 16 is free to rotate about the hinges 74 and 74' to an unfolded position. During a second increment of rotation of the operating handle 22 there is a lost motionof the operating shaft 94 resulting from an angular spacing between the cam 160 and latch lever 142 of the first latch A and between the cam 132 nad latch lever 98 fo the second latch B. During this lost motion of the opeating shaft 94 in the unlatching sequence, the third panel 16 is propelled rearwardly in an unfolding motion toward the bed orientation, by means which will be described presently. During a third increment of motion of the operating handle 22, the cam 160 displaces the latch lever 142 to unlatch the first latch A and release the first panel 12 from the base 10. this permits forward motion of the first panel 12 by traverse thereof on the carriage plates 40 and 40', in a manner which will be described subsequently. During a fourth increment of motion of the operating handle 22, the latch cam 132 engages the latch lever 98 and unlatches the second latch B. This releases the quadrant plate 80 from the latch plate 90 and allows the quadrant plate 80 to rotate about the pivot pin 82 in the support arm 36. This rotation of the quadrant plate 80 is augmented by the downward motion of the second panel 14, which is supported to the rear of the pivot pin 82. This rotation of the quadrant plate 80 in the counterclockwise direction (as viewed in FIG. 1) causes a forward and upward motionof the first panel 12. The complete motion of the panels 12, 14 and 16 will be described after further description of the above-mentioned means for propelling the third panel 16 rearwardly to unfold the same.

In order to initiate the unfolding action of the third anel 16 from the second panel 14, actuating means 210 are provided (see FIGS. 3 and 6). The actuating means 210 comrpises, in general, an actuating lever 212, and energy storage spring 224 and an overcenter linkage 218. The actuating lever 212 is formed as a crank-shaped rod wiht a transverse section pivotally mounted by a journal plate 214 on the cross beam 32. The rear end of the actuating lever 212 carries a roller 216 which, as best shown in FIG. 1, is adapted to forcibly engage the beam 70 which serves as a track member on the third panel 16. THe forward end fo the actuating lever 212 is connected with the lower end of the overcenter linkage 218 by a transverse pin 222 affixed to the end of the lever 212. The energy storage spring 224 has one end connected with the pin 222 and the other end is anchored in the cross-beam 28 which extends between the legs 26 and 26'. A blocking plate 226 is affixed to the actuating lever 212 adjacent the pin 222 for reasons to be described subsequently.

Figures 7, 8, 9:
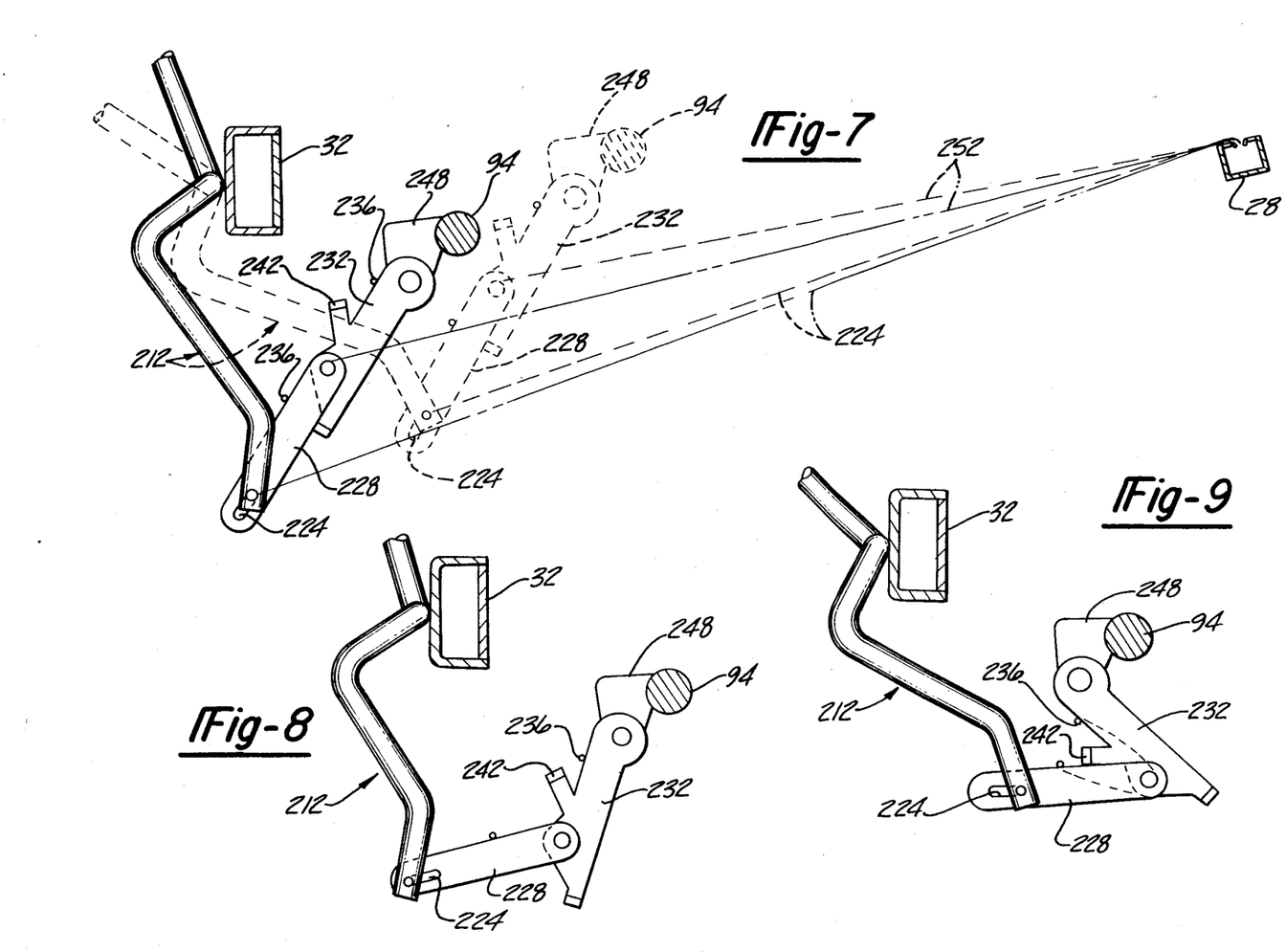
FIG. 7 is a view taken on lines 7—7 of FIG. 2 showing certain partsin alternative positions.
FIG. 8 shows the parts of FIG. 7 in another position.
FIG. 9 shows the parts of FIG. 7 in still another position.

The overcenter linkage 218, as shown in FIGS. 6 and 9, comprises a lower link 228 and an upper link 232 which are pivotally connected together by a pivot pin 234. A torsion spring 236 on the pin 234 has one end bearing against the lower link 228 and the other end bearing against the upper link 232. The upper link 232 is provided wtih a lower ear 238 adapted to engage the lower link 228 when the links are in an overcenter position (as shown in FIG. 6) whereby the overcenter linkage can support a sompressive load. The upper link 232 also has an upper ear 242 adapted to be engaged byt he lower link 228 when the links 228 and 232 are in a folded relationship to limit the motion thereof. The lower end of the lower link 228 is provided with a slot 244 which receives the pin 222 in a lost motion connection, for a purpose to be described subsequently. The upper end of the upper link 232 is connected by a pivot pin 246 to the operating shaft 94 by a bracket 248. A pilot spring 252 is cdnnected between the pivot pin 234 of the overcenter linkage 218 and the cross beam 28.

The operation of the actuating means 210 will be described with reference to converting from the bed to the seat orientation and then vice versa. In the bed orientation, as shown in FIG. 6, both the energy storage spring 224 and the pilot spring 252 are in an unstretched or relaxed state and the actuating lever 212 is in a substantially horizontal position. The lever 212 is in its limiting counterclockwise position as determined by abutment with cross beam 32. The uper (rearward) arm of the lever 212 is slightly flexed with the panels 14 and 16 flat and the roller 216 pushes against the beam 70 of the third panel 16. This tends to "break" the hinge joint of the panels 14 and 16 to help initiate bed-to-seat conversion. The overcenter linkage 218 is in a state of tension between the pin 222 and the pin 246, as a result of the upward movement of the rear edge of the first panel 12 which was produced by seat-to-bed conversion. Note that pin 222 is at the bototm of slot 244 in the lower link 228; in this state, the overcenter linkage 218 serves to stabilize the panel 12 of the bed against fore and aft motion.

When converting from the bed orientation, just described, to the seat orientation, the actuating means 210 operates in a manner to store energy in the spring 224 for subsequent use in converting from the seat to bed orientation. This action is as follows. When the opeating lever 22 is rotated in a counterclockwise direction (as view in FIG. 6) the third latch C is actuated and the first and second panels are unlatched from each other. Simultaneously with, or after, lifting the operating lever 22, the user pulls upwardly and forwardly on the strap 76; when the inlatching occurs, the operating lever 22 should be released and the pull on the strap 76 should be continued. The pull on the strap 76 causes the second panel 14 to commence folding and the first panel 12 commences to move rearwardly and downwardly at its rear edge under the control of the quadrant plates 80 and 80'. At the same time, the third panel 14 commences to move forwardly and to fold toward the underside of the second panel 14. The rearward and downward motion of the first panel 12 moves the overcenter linkage 218 so that the pin 222 is engaged by the upper end of the lost motion slot 244; at the same time, the torsion spring 236 is effective to bias the overcenter linkage 218 into the overcenter, substantially straight position so that it can support a compression load. This condition of the linkage 218 is shown in interrupted line in FIG. 7. The continued rearward motion of the first panel 12 (which carries operating shaft 94) stretches the pilot spring 252 and the energy absorbing spring 224. Thus, a predetermined amount of energy is stored in the spring 224. At an intermediate stage in this folding action of the panels 12, 14 and 16, the forward edge of the third panel 16 will move upwardly and away from the roller 216 and the actuating lever 212 will pivot in a clockwise direction (viewed in FIG. 6) so that it approaches the nearly upright position as seen in FIG. 1. During this stage, the roller 216 is removed from engagement with the beam 70 on the third panel 16. In this condition, the overcenter linkage 218 is in compression against the pin 222 in the actuating lever 212. This is shown in solid line in FIG. 7. As the third panel 16 continues to swing forwardly on its hinges 74 and 74', it reengages the roller 216 in its nearly upright position (shown in FIG. 1) and rotates the actuating lever 212 a small distance further in the clockwise direction. This further clockwise motion of the actuating lever 212 stretches the energy storage spring 224 an additional amount. This relieves the compression force in the overcenter linkage 218. With the compression force relieved, the pilot spring 252 overcomes the torsion spring 236 and pulls the overcenter linkage 218 to its folded condition, as shown in FIG. 8. At this point the latch D is latched and holds the panel 16 folded against panel 14 and the actuating lever 212 holds the spring 224 in its stretched condition. This places the overcenter linkage 218 in a state of readiness for converting from the seat orientation to the bed orientation. (As will be seen from the description that follows, if the overcenter linkage 218 is not folded in preparation for conversion from seat-to-bed, it will interfere with the transfer of force from tehenergy storage spring 224 through the actuating lever 212 to the third panel 16 for unfolding thereof. This interference would occur if the overcenter linkage remained stiff, i.e. in its overcenter position, because upon release of the third panel 16 by latch D, th ethird panel 16 would be urged to unfold by the spring force only until the actuating lever 212 rotated counterclockwise enough so that the pin 222 would reach the upper end of the slot 244 which would place the linkage 218 in compression and block further rotation of the actuating lever 212.)

In converting from the seat orientation to the bed orientation, the first stage is that of applying the energy stored in the spring 224 to unfold the third panel 16 from the second panel 14. The sequence, as controlled by the rotation of the operating lever 22 in the counterclockwise direction is as follows. First, the latch D is unlatched to release the panel 16. Further rotation of the operating lever 22 unlatches the latch A which releases the first panel 12 from the base 10. Then latch B is unlatched which allows panel 12 to move up and forwardly to a horizontal position and allows the second panel 14 to unfold downwardly by rotation of the sector plate 80 and 80'. In the first stage of unfolding from seat-to-bed, i.e. upon unlatching of latch D, the ctuating lever 212 through roller 216 thrusts the third panel 16 rearwardly under the force of energy storage spring 224. By reason of the overcenter linkage 218 being folded, all of the energy in the spring 224 is expended in pushing the third panel 16. The spring 224, through actuating lever 212, pushes the third panel 16 rearwardly to such an extent that it swings beyond the vertical position and rests onthe legs 20 and 20', the legs being hinged to permit this action. In this intermediate position, the overcenter linkage 212 is in the position shown in FIG. 9. In this intermediate position, the third panel 16 is extended to the limit of the actuating lever 212 but the second panel 14 is still locked in the seat position. The overcenter linkage 218 is closed or folded to its limiting position in which the ear 242 on link 232 is engaged by the link 228. (The folded length of the overcenter linkage 218 determines the extent of rotation of the actuating lever 212 in the counterclockwise direction. This positions the actuating lever 212 at such an angle that the third panel 16 can be reclosed against the roller 216 on the lever 212 by manually swinging the panel 16 forwardly to reclose latch D in the seat orientation.) In the next stage of unfolding, panel 12 moves upwardly and forwardly toward a horizontal position and panel 14 folds downwardly. When this position is reached, latch C is automatically latched to lock the panels 14 and 12 together and the overcenter linkage 218 is placed in tension to stabilize the first panel 12 of the bed against fore and aft motion.

As noted above, in the conversion from seat-to-bed, the latches D, A and B are unlatched sequentially in the order named. Latch D must be unlatched to release the third panel 16 before unlatching of latches A and B which release the first and second panels 12 and 14. (If the panels were released simultaneously, th third panel 16 would drop to the floor instead of swinging to its extended position.) It is also desirable to prevent the unlatching sequence to occur too fast because that too will cause the third panel to drop to the floor before it swings to its extended position. For this purpose, the blocking plate 226 referred to above is provided on the lower end of the actuating lever 212. This blocking plate 226 is provided with a notch or window 227. The latch member 202 as mentioned previously, is provided with a stop arm 206 extending laterally toward the blocking plate 226. The stop arm 206 coacts with the blocking plate 226 to prevent unlatching latches A and B too quickly after latch D. When the opeating lever 22 is pulled slowly, latch D is unlatched and the third panel swings to its extended position before latches A and B are unlatched. This is the normal operation. During normal seat-to-bed converions, and vice versa, stop arm 206 does not engage blocking member 226. However, if operating lever 22 is pulled too quickly, the stop arm 206 will engage blocking member 226 before blocking member 226 is moved out of the path of arm 206 bythe clockwise rotation of the actuating lever 212. Engagement of stop arm 206 with blocking plate 226 will prevent unlatching of latches A and B until the third panel 16 reaches its extended position. This ensures normal operation. (However, if for some reason normal conversion sequence does not occur the window 227 allows blocking plate 226 nd stop arm 206 to be positioned for normal operation in the next cycle of operation.

Although the description of this invention has been given with reference to a particular embodiment, it is not to be construed ina limiting sense. Many variations nad modifications will now occur to those skilled in the art. For a definition of the invention reference is made to the appended claims.

What is claimed is:

1. In a convertible seat-bed mechanism of the type comprising:
   a base,
   first and second panels pivotally coupled to each other and supported by the base and adapted, respectively, to form a seat bottom and seat back in a seat orientation and to form side-by-side bed panels in a bed orientation,
   a third panel pivotally coupled with said second panel and adapted to form a third bed panel in said bed orientation,
   latching means for securing said third panel relative to the base in said seat orientation,
   and manually actuable means for operating said latching means,
   a member adjacent the coupling of said second and third panels adapted to be manually moved for folding said panels from teh bed orientation to the seat orientation,
   the improvement comprising:
   energy storage means,
   linkage means for imparting motion to said energy storage means by movement of one of said first and second panels from the bed orientation to the seat orientation whereby energy is stored in said energy storage means,
   and an actuating member coupled with said energy storage means for moving said third panel toward the bed orientation by release of energy from said storage means upon unlatching of said latching means.

2. The invention as defined in claim 1 wherein said energy storage means comprises a spring connected between the base and the first panel.

3. The invention as defined in claim 2 wherein said mechanism comprises:
   means for imparting lowering movement to the rear of said first panel when said mechanism is converted from the bed orientation to the seat orientation,
   and said linkage means is coupled between said spring and said first panel for stretching said spring by said lowering movement when the mechanism is converted from the bed orientation to the seat orientation.

4. The invention as defined in claim 3 wherein:
   said actuating member comprises an actuating lever pivotally mounted on said base and coupled with said spring and urging said third panel toward its bed orientation when the spring is stretched.

5. The invention as defined in claim 4 wherein said linkage means is an overcenter linkage.

6. The invention as defined in claim 5 including:
   a track member extending fore and aft on said third panel,
   said actuating lever being pivotable about a horizontal axis and having one end connected with said spring and the other end movably engageable with said track member.

7. The invention as defined in claim 6 including:
   stop means for limiting the upward movement of said one end of said actuating lever whereby said overcenter linkage is in tension with said mechanism in the bed orientation for stabilizing said panels.

8. The invention as defined in claim 5 including,
   means for maintaining said overcenter linkage in its overcenter, substantially straight condition during the stretching of said spring,
   and means for moving said overcenter linkage to a folded condition when said mechanism reaches the seat orientation whereby substantially all of the stored energy in said spring may be applied to said third panel during conversion from the seat orientation to the bed orientation.

9. The invention as defined in claim 8 wherein said latching means is a first latch and including:
   a second latch for securing said second panel to said third panel in the seat orientation,
   and means for preventing unlatching of said second latch until after unlatching of said first latch and until said third panel unfolds a predetermined amount toward said bed orientation.

10. The invention as defined in claim 9 including:
    means for preventing actuation of said manually actuable means for unlatching said second latch until said actuating lever has rotated a predetermined distance after unlatching of said first latch.

* * * * *